United States Patent
Katz et al.

(10) Patent No.: US 9,940,747 B2
(45) Date of Patent: Apr. 10, 2018

(54) MAPPING 3D TO 2D IMAGES

(71) Applicant: BIOSENSE WEBSTER (ISRAEL) LTD., Yokneam (IL)

(72) Inventors: Natan Sharon Katz, Atlit (IL); Lior Zar, Poria Illit (IL); Aharon Turgeman, Zichron Ya'acov (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 105 days.

(21) Appl. No.: 14/956,918

(22) Filed: Dec. 2, 2015

(65) Prior Publication Data
US 2017/0161936 A1 Jun. 8, 2017

(51) Int. Cl.
G06T 15/10 (2011.01)
G06T 19/00 (2011.01)
G06T 17/00 (2006.01)

(52) U.S. Cl.
CPC .......... *G06T 15/10* (2013.01); *G06T 17/00* (2013.01); *G06T 19/00* (2013.01); *G06T 2210/41* (2013.01); *G06T 2219/008* (2013.01)

(58) Field of Classification Search
None
See application file for complete search history.

(56) References Cited

U.S. PATENT DOCUMENTS

| 7,643,662 B2 | 1/2010 | Gering | |
|---|---|---|---|
| 8,611,989 B2 | 12/2013 | Roberts | |
| 2007/0066968 A1* | 3/2007 | Rahn | A61B 5/01 606/27 |
| 2011/0142306 A1* | 6/2011 | Nair | G06T 3/0037 382/128 |

(Continued)

FOREIGN PATENT DOCUMENTS

EP 2800063 A2 11/2014

OTHER PUBLICATIONS

John Brosz, Faramarz F. Samavati, M. Sheelagh T. Carpendale, Mario Costa Sousa, "Single Camera Flexible Projection", Aug. 5, 2007, ACM, NPAR '07, Proceedings of the 5th International Symposium on Non-Photorealistic Animation and Rendering, pp. 33-42.*

(Continued)

*Primary Examiner* — Robert Bader
(74) *Attorney, Agent, or Firm* — Notaro, Michalos & Zaccaria P.C.

(57) ABSTRACT

A method for mapping a 3D surface that contains a volume in space, the method including: acquiring 3D vertices representing the surface, and defining in the space a first plane cutting the volume and a second parallel plane, external to the volume, thereby partitioning the vertices into a first set not between the two planes and a second set located between the two planes. The method further includes projecting the first set vertices onto the first plane so as to generate first projected points therein, and projecting the second set vertices onto the first plane while translating these vertices in respective directions parallel to the second plane by respective translations responsive to respective distances of the second vertices from the first plane, thereby generating second projected points in the first plane. The first and second projected points are displayed as a 2D representation of the surface on a screen.

24 Claims, 6 Drawing Sheets

(56) References Cited

U.S. PATENT DOCUMENTS

2013/0088491 A1    4/2013  Hobbs et al.
2014/0330111 A1*  11/2014  Lichtenstein ......... G06T 11/206
                                                        600/424

OTHER PUBLICATIONS

Thomas W. Sederberg, Scott R. Parry, "Free-Form Deformation of Solid Geometric Models", Aug. 1986, ACM, SIGGRAPH '86 Proceedings of the 13th annual conference on Computer graphics and interactive techniques pp. 151-160.*

Jonathan Levene, "A Framework for Non-Realistic Projections", May 1998, Masters Thesis.*

European Search Report, Application No. 16201785.9 dated Mar. 14, 2017.

Martyn P. Nash, et al., Evidence for Multiple Mechanisms in Human Ventricular Fibrillation, AHA Journal, Jul. 31, 2006, Retrieved on Mar. 3, 2017 from the Internet, URL:http://circ.ahajournals.org/content/11/4/536.

Karim Rashed, et al., Surface Flattening of the Human Left Atrium and Proof-Of-Concept Clinical Applications, vol. 31, No. 4, 2014, pp. 251-266.

* cited by examiner

MAPPING 3D TO 2D IMAGES

FIELD OF THE INVENTION

The present invention relates generally to image mapping, and specifically to mapping of three-dimensional images to two-dimensional images.

BACKGROUND OF THE INVENTION

The representation of a three-dimensional structure on a two-dimensional screen may typically involve a reduction in the quality of the information being presented. The reduction is typically significant in the case of anatomical structures, and a number of prior art references address this problem.

U.S. Pat. No. 7,643,662, to Gering, whose disclosure is incorporated herein by reference, describes a system for accessing a three dimensional representation of an anatomical surface and flattening the anatomical surface so as to produce a two dimensional representation of the anatomical surface.

U.S. Pat. No. 8,611,989, to Roberts, whose disclosure is incorporated herein by reference, describes a method of generating an image of a segment of a lumen structure. The method comprises acquiring volumetric image data and rendering a planar slab image based on a thickness and the volumetric image data.

U.S. Patent Application 2013/0088491, to Hobbs et al., whose disclosure is incorporated herein by reference, describes a two-dimensional (2D) animation that may be generated from a three-dimensional (3D) mesh by a machine or device that flattens, textures, and modifies the 3D mesh, which results in distorting the texture of the 3D mesh.

U.S. Patent Application 2011/0142306, to Nair, whose disclosure is incorporated herein by reference, describes providing a 3D dataset of a heart and generating a 2D representation of a curved surface of the 3D dataset by flattening out the curved surface of the heart.

Documents incorporated by reference in the present patent application are to be considered an integral part of the application except that, to the extent that any terms are defined in these incorporated documents in a manner that conflicts with definitions made explicitly or implicitly in the present specification, only the definitions in the present specification should be considered.

SUMMARY OF THE INVENTION

An embodiment of the present invention provides a method for mapping a three-dimensional (3D) surface that contains a volume in a 3D space, the method including:

acquiring a set of 3D vertices representing the 3D surface;

defining in the 3D space a first plane that cuts the volume and a second plane, parallel to the first plane, that is external to the volume, thereby partitioning the 3D vertices into a first set of the vertices that are not between the first and second planes and a second set of the vertices that are located between the first and the second planes in the 3D space;

projecting the vertices in the first set onto the first plane so as to generate first projected points in the first plane;

projecting the vertices in the second set onto the first plane while translating the vertices in the second set in respective directions parallel to the second plane by respective translations responsive to respective distances of the second vertices from the first plane, thereby generating second projected points in the first plane; and displaying the first and second projected points together as a two-dimensional (2D) representation of the 3D surface on a screen.

Typically the method includes projecting the vertices in the first set onto the first plane orthogonally to the first plane. Alternatively or additionally the method includes projecting the vertices in the second set onto the first plane orthogonally to the first plane.

In a disclosed embodiment the respective translations are directly proportional to the respective distances.

In a further disclosed embodiment the respective translations are responsive to a distance, measured parallel to the first plane, to a pre-defined point in the second plane. Typically, each of the respective translations of a given vertex is directly proportional to the distance from the given vertex to the pre-defined point.

In an alternative embodiment the 3D surface includes a surface of a heart chamber.

In a further alternative embodiment the 3D surface comprises a 3D surface of a distal tip of a catheter. The 3D surface may be a temperature distribution map of the distal tip.

In a yet further disclosed embodiment displaying the first and second projected points includes forming a 2D surface including the points.

Typically, the 3D surface includes an axis of symmetry, and the 2D representation has symmetry related to the axis of symmetry.

In an embodiment the 3D surface has no symmetry.

There is further provided, according to an embodiment of the present invention, apparatus for mapping a three-dimensional (3D) surface that contains a volume in a 3D space, the apparatus including:

a screen configured to display a two-dimensional (2D) representation of the 3D surface; and a processor configured to:

acquire a set of 3D vertices representing the 3D surface, define in the 3D space a first plane that cuts the volume and a second plane, parallel to the first plane, that is external to the volume, thereby partitioning the 3D vertices into a first set of the vertices that are not between the first and second planes and a second set of the vertices that are located between the first and the second planes in the 3D space, project the vertices in the first set onto the first plane so as to generate first projected points in the first plane, project the vertices in the second set onto the first plane while translating the vertices in the second set in respective directions parallel to the second plane by respective translations responsive to respective distances of the second vertices from the first plane, thereby generating second projected points in the first plane, and transfer the first and second projected points to the screen.

The present disclosure will be more fully understood from the following detailed description of the embodiments thereof, taken together with the drawings, in which:

DETAILED DESCRIPTION OF EMBODIMENTS

Overview

During a medical procedure, there is typically a large amount of information that needs to be presented to the operating physician, in order for the physician to carry out the procedure effectively. However, particularly in the case of a three-dimensional (3D) representation of an organ of the body of a patient, or of a 3D map of an entity such as a temperature distribution, it is difficult to effectively present the 3D images on a two dimensional (2D) screen.

Embodiments of the present invention provide a presentation of a 3D surface that may be used to overcome the difficulty. A set of vertices, representing a 3D surface containing a volume in 3D space, is acquired. Two parallel planes are defined: a first plane that cuts the volume and a second plane that is external to the volume. The two planes partition the 3D vertices into a first set of vertices not between the two planes, and a second set of vertices that are between the two planes.

The vertices in the first set are projected, typically orthogonally, onto the first plane, so generating a first set of projected points.

The vertices in the second set undergo two transformations: a translation and a projection. The projection is onto the first plane, typically orthogonally. The translation is parallel to the planes and, for a given vertex, the amount of translation is responsive to the distance of the vertex, and is typically directly proportional to the distance.

The first and second projected points are displayed on the screen as a 2D representation of the 3D surface.

System Description

Figure 1:
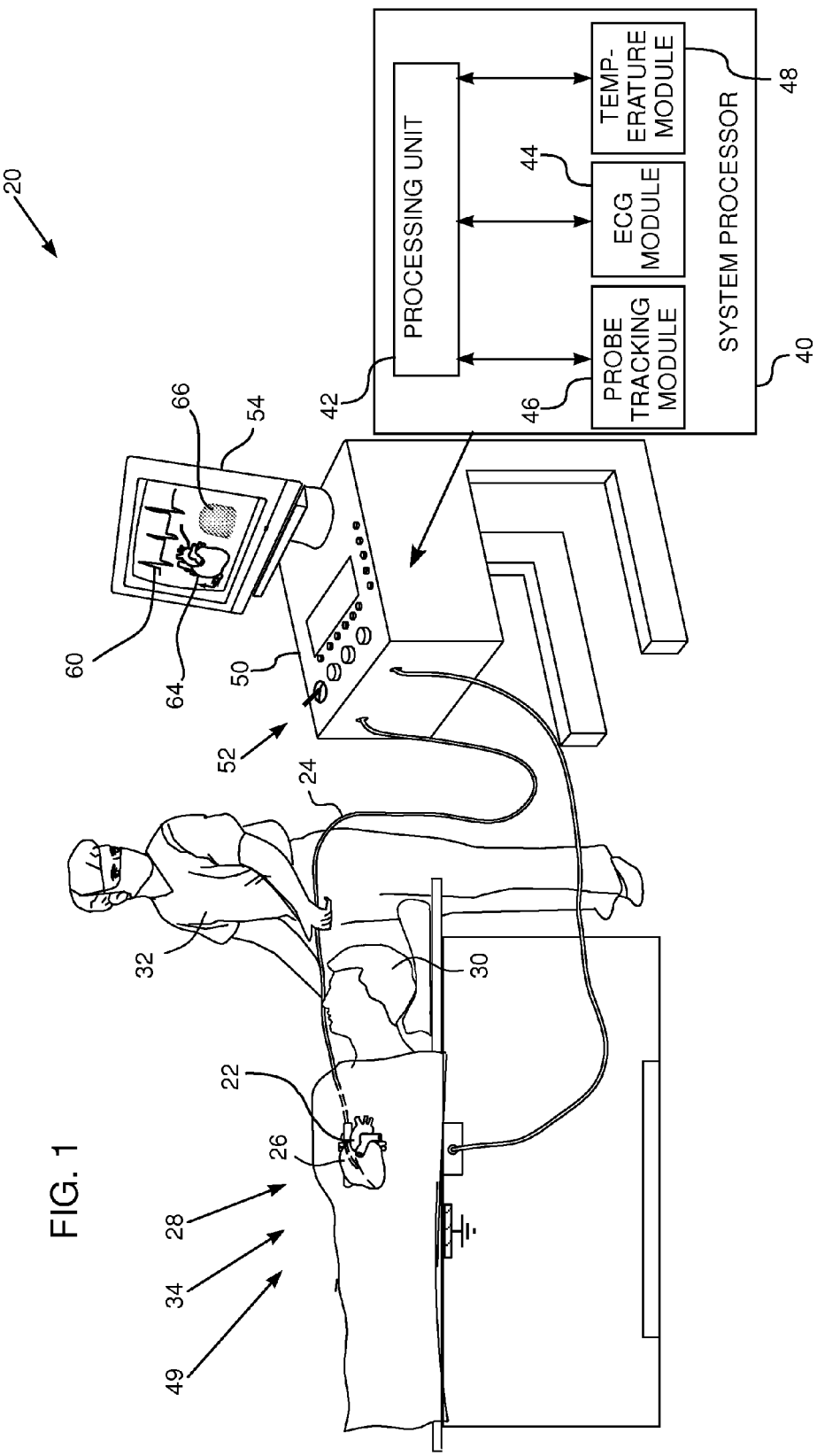
FIG. 1 is a schematic illustration of an image manipulation system, according to an embodiment of the present invention.

Reference is now made to FIG. 1, which is a schematic illustration of an image manipulation system 20, according to an embodiment of the present invention. System 20 is typically used during a medical procedure on a body organ of a subject 30, and in the description herein the body organ, by way of example, is assumed to comprise a heart 22, wherein the system is applied to view three-dimensional (3D) images derived from measurements on the heart. However, it will be understood that system 20 may be applied to view other 3D images, including 3D images of entities other than body organs.

System 20 may be controlled by a system processor 40, comprising a processing unit 42 communicating with an electrocardiogram (ECG) module 44, a probe tracking module 46, and a temperature module 48. The functions of modules 44, 46, and 48 are described below. Processor 40 may be mounted in a console 50, which comprises operating controls 52 which typically include a pointing device such as a mouse or trackball. Professional 32 uses the operating controls to interact with the processor, which, as described below, may be used to present results produced by system 20 to the professional on a screen 54.

Processor 40 uses software stored in a memory of the processor to operate system 20. The software may be downloaded to processor 40 in electronic form, over a network, for example, or it may, alternatively or additionally, be provided and/or stored on non-transitory tangible media, such as magnetic, optical, or electronic memory.

To perform the procedure on heart 22, professional inserts a catheter 24, also herein termed a probe, into the heart. In order to track the 3D position of probe 24, the probe comprises a sensor 28 installed into a distal tip 26 of the probe. Sensor 28, typically one or more coils, generates signals in response to magnetic fields traversing the sensor. The signals are conveyed, typically via probe 24, to processing unit 42, which uses probe tracking module 46 to analyze the signals so as to determine the 3D location and 3D orientation of the distal tip of the probe. The Carto® system, produced by Biosense Webster, of Diamond Bar, Calif., uses a tracking system similar to that described herein to track the location and orientation of the distal tip of a probe inserted into a subject.

Distal tip 26 typically comprises an electrode 34 which acquires electropotentials of a section of heart 22 in contact with the electrode. The electropotentials are conveyed, typically via probe 24, to processing unit 42, which uses ECG module 46 to analyze the signals. The analysis typically includes generating electropotential vs. time graphs, as well as determining a local activation time (LAT) of the section of heart contacted by the electrode.

Distal tip 26 may also have one or more temperature sensors 49, typically comprising thermocouples. Sensors 49 generate signals which are conveyed to processing unit 42, and the processing unit uses temperature module 48 to determine the temperatures measured by the sensors.

Processor 40 typically comprises modules other than the modules referred to above, such as a force module that measures a force on distal end 26, and an ablation module that provides regulated power to electrode 28, or another electrode in the distal end. For simplicity, such modules are not shown in FIG. 1. The Carto® system referred to above uses such modules.

A screen 54 displays results produced by processor 40. Typically, the resultant signals from ECG module 44 are presented on screen 54 in the form of one or more potential vs. time graphs, and a schematic example 60 of such a graph is illustrated in FIG. 1. However, the resultant ECG signals may also be used by processor 40 to derive other results associated with the ECG signals, such as the LATs referred to above. The results from probe tracking module 46 may be presented on screen 54 in the form of a three-dimensional map 64 of the internal surface of heart 22, and as well as incorporating the locations of distal tip 26 as it is moved in the heart, such a map may also incorporate other values, such as the LAT values at the location of the distal tip.

The results from temperature module 48 may also be presented on screen 54 in the form of a three-dimensional map 66 of the temperature distribution of the internal surface, measured around distal tip 26.

Maps such as map 64 and map 66 are maps of a three-dimensional surface that are presented on the two-dimensional (2D) surface of screen 54. There is typically a large amount of information incorporated into both maps, and such information becomes more difficult to comprehend because of, inter alia, the reduction from a true three-dimensional representation of the map to a two-dimensional surface. Embodiments of the present invention provide professional 32 with a method for manipulating the presentation of a map such as map 64 or map 66 on screen 54, so as to improve the comprehension of selected features of the map.

Figure 2:
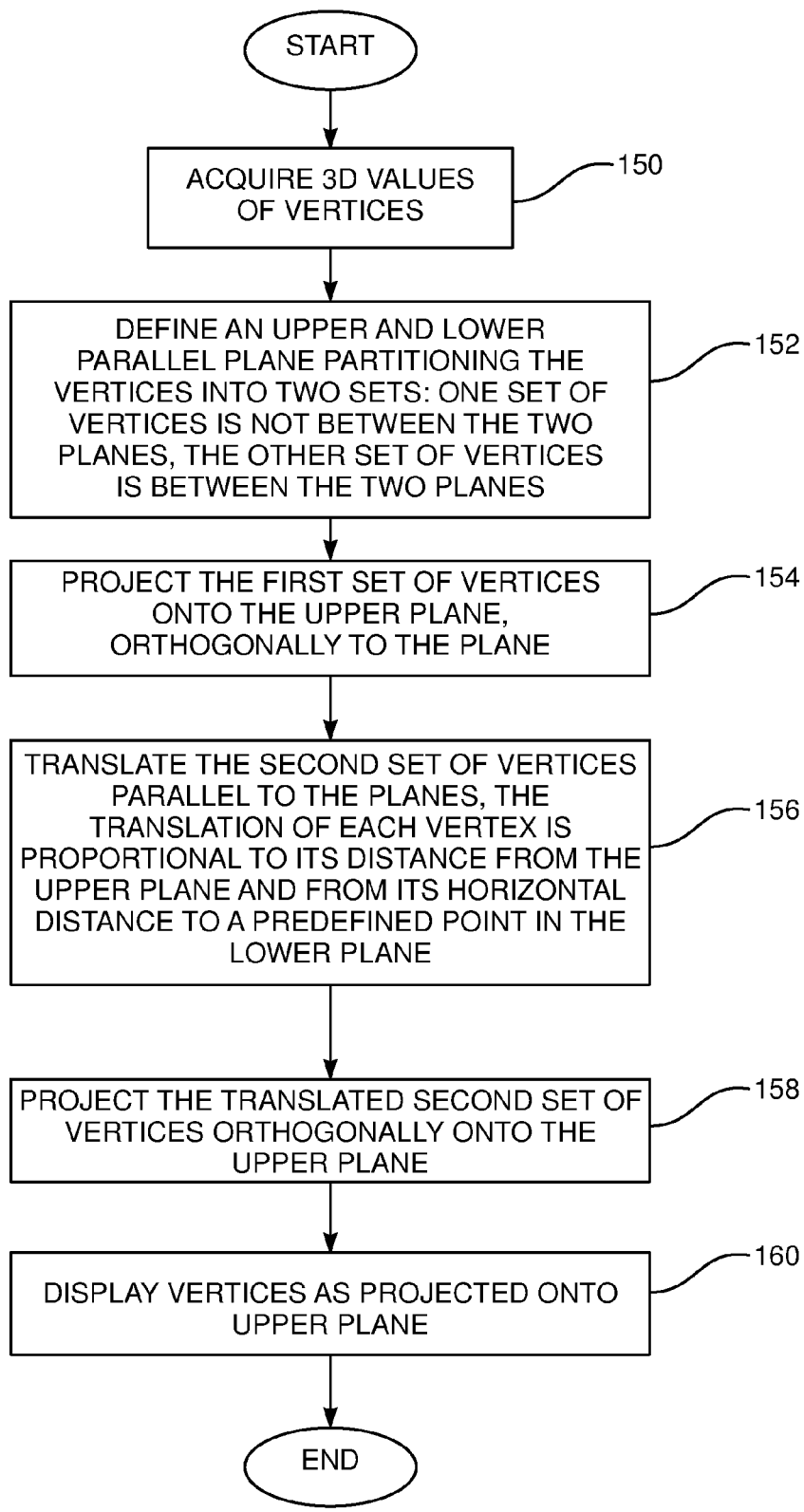
FIG. 2 is a flowchart of steps performed in manipulating the presentation of a three-dimensional (3D) surface, according to an embodiment of the present invention.

FIG. 2 is a flowchart of steps performed by processor 40 in manipulating the presentation of a three-dimensional (3D) surface, according to an embodiment of the present invention. In the following description, by way of example the steps of the flowchart are described assuming that processor 40 operates on a 3D mesh from which map 66 is derived.

Figure 3:
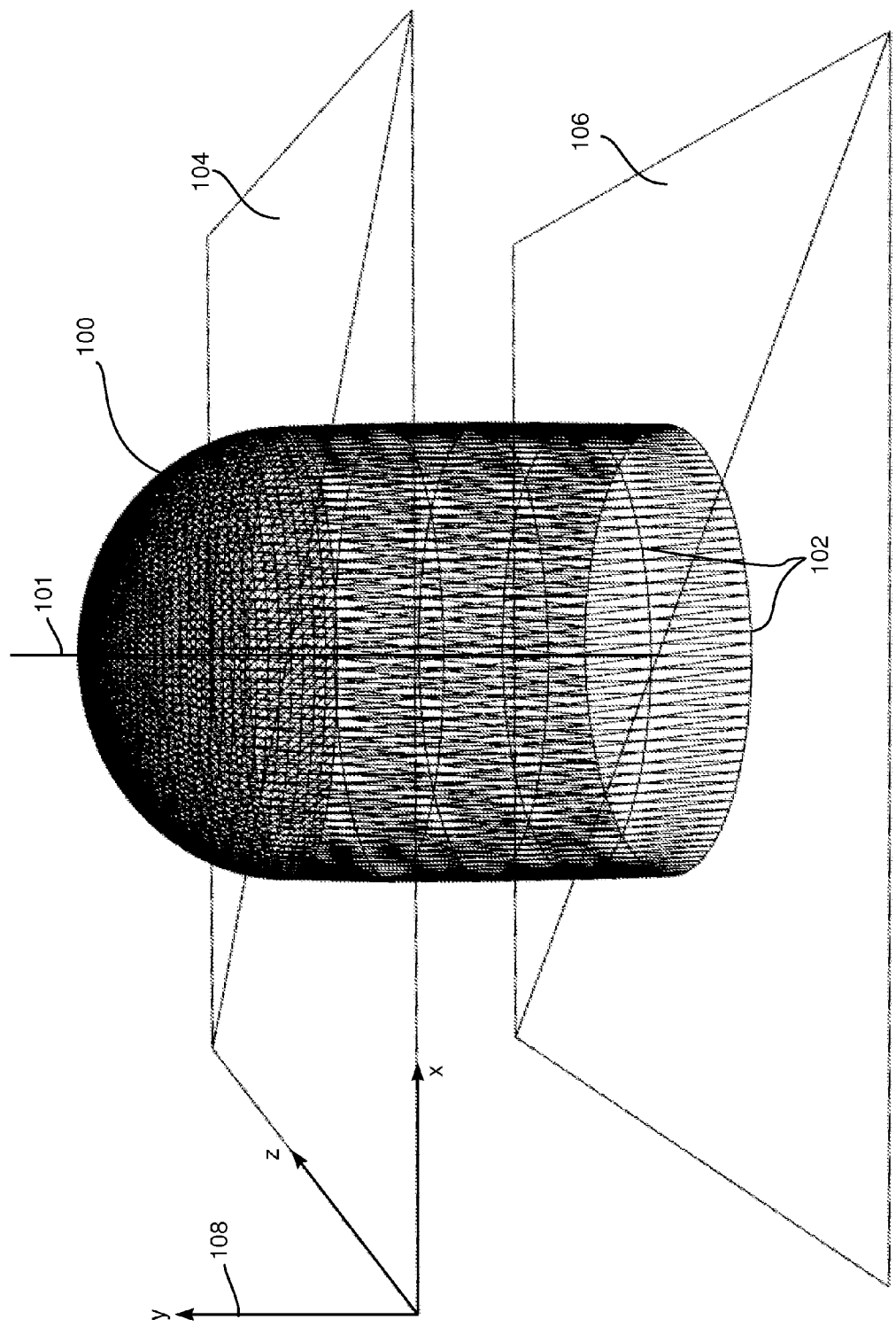
FIG. 3 is a schematic diagram of a 3D mesh, according to an embodiment of the present invention.

FIG. 3 is a schematic diagram of a 3D mesh 100 from which map 66 is derived, according to an embodiment of the present invention. Mesh 100 is dome-shaped, having an axis of symmetry 101, and comprises a plurality of vertices 102. The vertices and the mesh are part of a surface that contains a volume in 3D space.

In an initial step 150 of the flowchart processor 40 acquires three-dimensional values of the vertices, formed on an xyz frame of reference 108, by any convenient means. For example, since mesh 100 corresponds to distal tip 26, the processor may generate 3D values of the vertices from the geometry of the distal tip. To produce the mesh, processor 40 connects vertices 102 by line segments, using a method for connection known in the art. Processor 40 typically produces a three-dimensional map from 3D mesh 100 by covering the mesh with a 3D surface that smoothly connects the line segments, after which temperatures in the form of different colors are incorporated into the 3D surface to produce map 66. However, for simplicity, the following description of the flowchart assumes that the processor operates on mesh 100.

Figure 4:
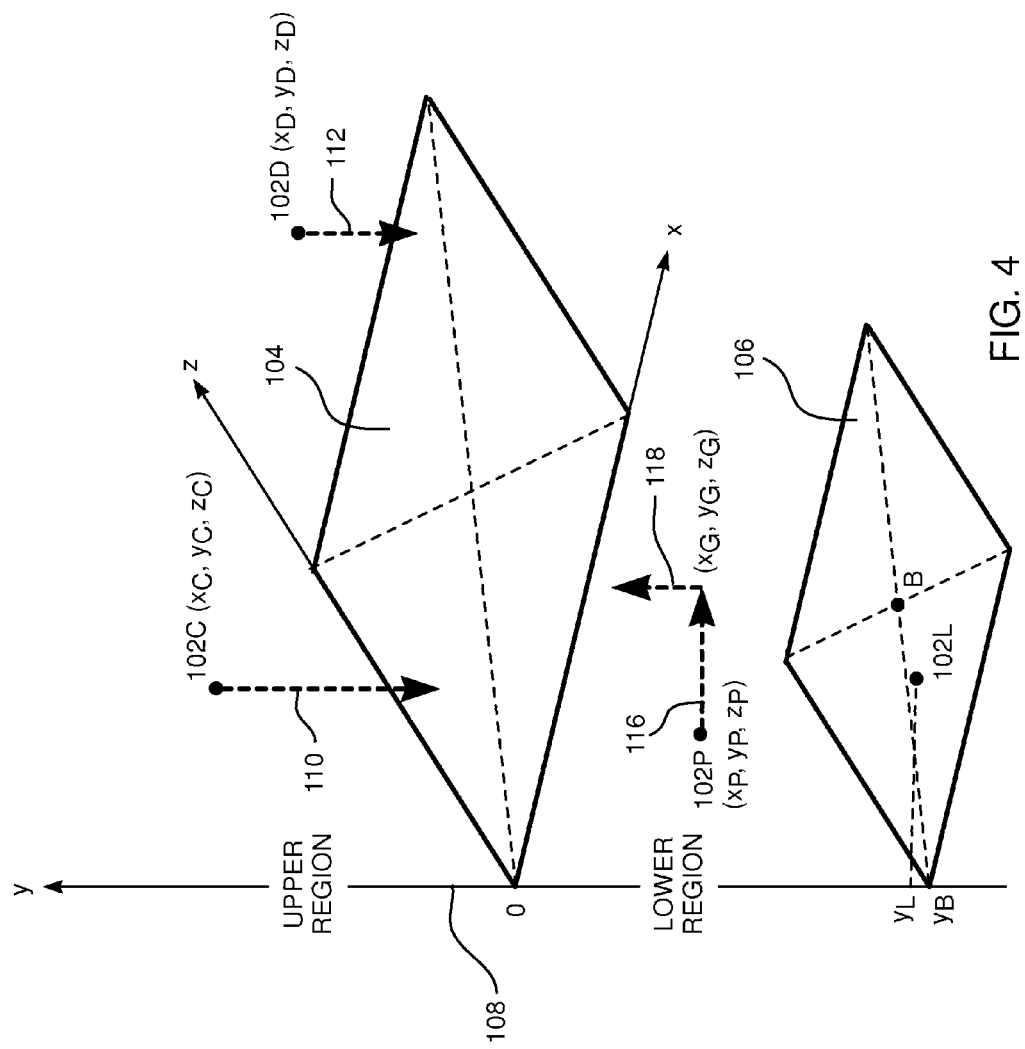
FIG. 4 is a view illustrating two planes and four vertices drawn on a frame of reference, according to an embodiment of the present invention.

In a plane definition step 152 professional 32 uses controls 52 to define two parallel planes 104, 106 for partitioning mesh 100. FIG. 4 is a view illustrating the planes and four vertices 102, termed 102C, 102D, 102P and 102L, of mesh 100 drawn on frame of reference 108, according to an embodiment of the present invention. For simplicity, in the description herein vertices 102C, 102D, 102P and 102L are assumed to have respective coordinates $(x_C, y_C, z_C)$, $(x_D, y_D, z_D)$, $(x_P, y_P, z_P)$, and $(x_L, y_L, z_L)$, the two planes are assumed to be horizontal xz planes, orthogonal to the y-axis, and the y-axis is assumed to be vertical. However, those having ordinary skill in the art will be able to adapt the description for cases where the y-axis is not vertical, so that the two xz planes, while being orthogonal to the y-axis, are not horizontal.

In addition, the following assumptions are also made:

The origin of frame of reference 108 is selected so that all vertices of mesh 100 have x, z, ≥0, and there is at least one vertex with y>0 and at least one vertex with y<0.

Plane 104 passes through the origin. In this case plane 104 has an equation given by equation (1):

$$y=0 \quad (1)$$

Plane 106 has an equation given by equation (2):

$$y=y_B \quad (2)$$

where $y_B$ is a negative value smaller than the most negative y-value of vertices 102. Vertex 102L is assumed to be the vertex of mesh 100 having the most negative value.

Plane 106 comprises a point B, having coordinates $(x_B, y_B, z_B)$. By way of example, plane 106 is drawn in FIG. 4 as a bounded plane having point B as its center, but in general point B may be any point on plane 106. In some embodiments, a vertical projection of the bounded plane in a positive y direction defines a rectangular parallelepiped that acts as a bounding box encompassing all of mesh 100.

It will be understood that using the assumptions above does not affect the generality of the results generated, and that those having ordinary skill in the art will be able to adapt the description herein, mutatis mutandis, for sets of vertices drawn on any frame of reference.

As illustrated in FIG. 4, planes 104 and 106 partition vertices 102 into two regions: an upper region comprising a first set of vertices 102 that are not between the two planes, and a lower region comprising a second set of vertices 102 that are between the two planes.

From equations (1) and (2), the distance between the two planes is $y_B$. In the following description, plane 104 is also referred to as the upper plane, and plane 106 is also referred to as the lower plane. It will be understood that the upper plane divides mesh 100 into two regions, the upper region (where y>0) above the plane, and the lower region (where y<0) below the plane. Vertices 102B and 102C are generic vertices in the upper region; vertex 102P is a generic vertex in the lower region; and vertex 102L is the lowest vertex in the lower region.

In a first projection step 154, processor 40 projects each vertex 102 of the upper region vertically, i.e., orthogonal to the planes and parallel to the y-axis, so that the projected points lie on the upper plane. Thus vertices 102C $(x_C, y_C, z_C)$ and 102D $(x_D, y_D, z_D)$, project, as shown respectively by broken arrows 110 and 112, to points $(x_C, 0, z_C)$ and $(x_D, 0, z_D)$.

In contrast to vertices in the upper region, which undergo a single transformation, vertices in the lower region are subject to two transformations, a horizontal translation and a vertical projection. Details of each of the transformations are described below with reference to steps 154 and 156.

In a translation step 156, processor 40 translates each of the vertices in the lower region horizontally, i.e., parallel to the planes. For a given vertex the translation is directly proportional to the distance of the vertex from the upper plane and to the horizontal distance from the vertex point B. The direction of the translation corresponds to the direction of the original vertex from a vertical line through point B.

The distance of generic vertex 102P, with coordinates $(x_P, y_P, z_P)$, from the lower plane may be normalized according to equation (3):

$$F = \left| \frac{y_P - y_B}{y_B} \right| \quad (3)$$

where F is the normalized distance from the generic vertex to the lower plane, and $0 \leq F \leq 1$.

Thus, if the generic vertex is on the lower plane, then F=0, and if the vertex is on the upper plane (which is the highest possible location for a generic vertex in the lower region), then $y_P$=0 and F=1.

It will be understood that the expression (1−F) gives a normalized distance for a generic vertex in the lower region to the upper plane.

A general equation for the horizontal translation of generic vertex $(x_P, y_P, z_P)$ is given by equation (4):

$$(x_G, y_G, z_G) = (x_P, y_P, z_P) + ((x_P - x_B) \cdot S \cdot (1-F), 0, (z_P - z_B) \cdot S \cdot (1-F)) \quad (4)$$

where $(x_G, y_G, z_G)$ are the coordinates to where vertex $(x_P, y_P, z_P)$ is translated, F is the normalized distance given by equation (3), and S is a scaling factor corresponding to a constant of proportionality of the scaling.

S may be any number greater than 1. A typical range of values of S is between 2 and 100, and in one embodiment S=10. From inspection of equation (4), it will be understood that the translation in an xz plane of any given vertex is a function of both S and F.

In step 156 S may typically be selected by professional 32 using controls 52.

A broken arrow 116 illustrates the horizontal translation of generic vertex $(x_P, y_P, z_P)$ to $(x_G, y_G, z_G)$.

In a second projection step 158, processor 40 projects each of the translated vertices generated in step 156 vertically upwards, i.e., parallel to the y-axis, so that the projected points lie on the upper plane. A broken arrow 118 illustrates the vertical projection. Thus, from equation (4), the final coordinates $(x_F, y_F, z_F)$ of the translated and projected generic vertex $(x_P, y_P, z_P)$ are given by equation (5):

$$(x_F, y_F, z_F) = ((x_P - x_B) \cdot S \cdot (1-F) + x_p, 0, (z_P - z_B) \cdot S \cdot (1-F) + z_p) \quad (5)$$

In a final display step 160, once the translations and projections described above have been implemented, the 2D result, of vertices that have been projected onto the upper plane, is displayed on screen 54, with the y-axis of the resultant mesh being orthogonal to screen 54.

It will be understood that the order of the projections and translations of the flowchart of FIG. 3 are by way of example, and other orders will be apparent to those having ordinary skill in the art. All such orders, including changes to the descriptions of the steps as necessary, are considered to be within the scope of the present invention. For example, translation step 156 may be implemented before either first projection step 154 and second projection step 158 are implemented.

Figure 5:
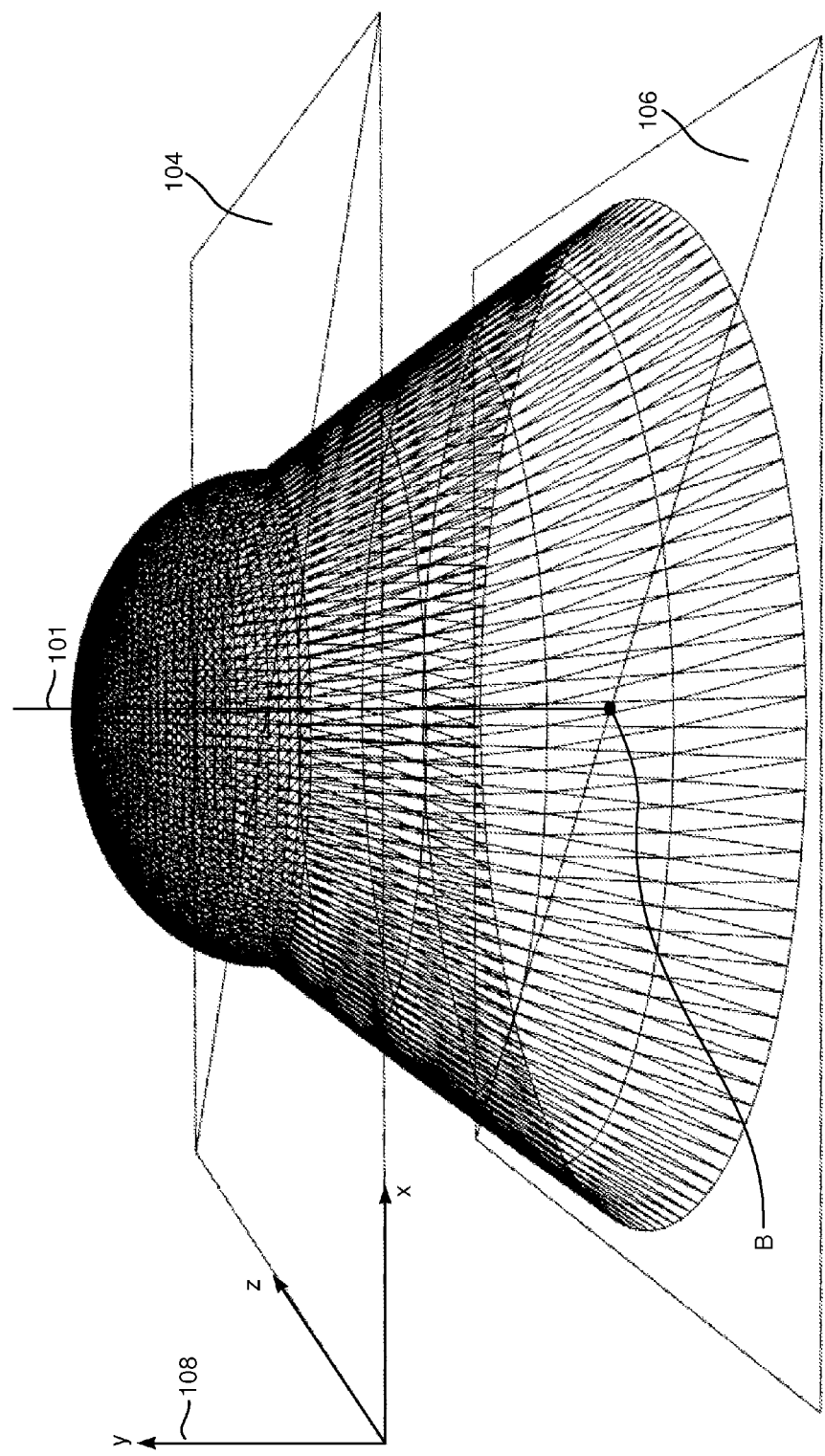
FIG. 5 illustrates the 3D mesh of FIG. 3 after a step of the flowchart of FIG. 2, according to an embodiment of the present invention.

FIG. 5 illustrates mesh 100 after translation step 156 has been performed on the mesh and before projection steps 154 and 158 are performed, according to an embodiment of the present invention. In FIG. 5, point B is assumed to be where axis of symmetry 101 of mesh 100 meets plane 106, and the value of scaling factor S is 2. It will be understood, from inspection of equation (4), that a smaller value of S "narrows" the base of the conical section produced in the lower region.

Figure 6:
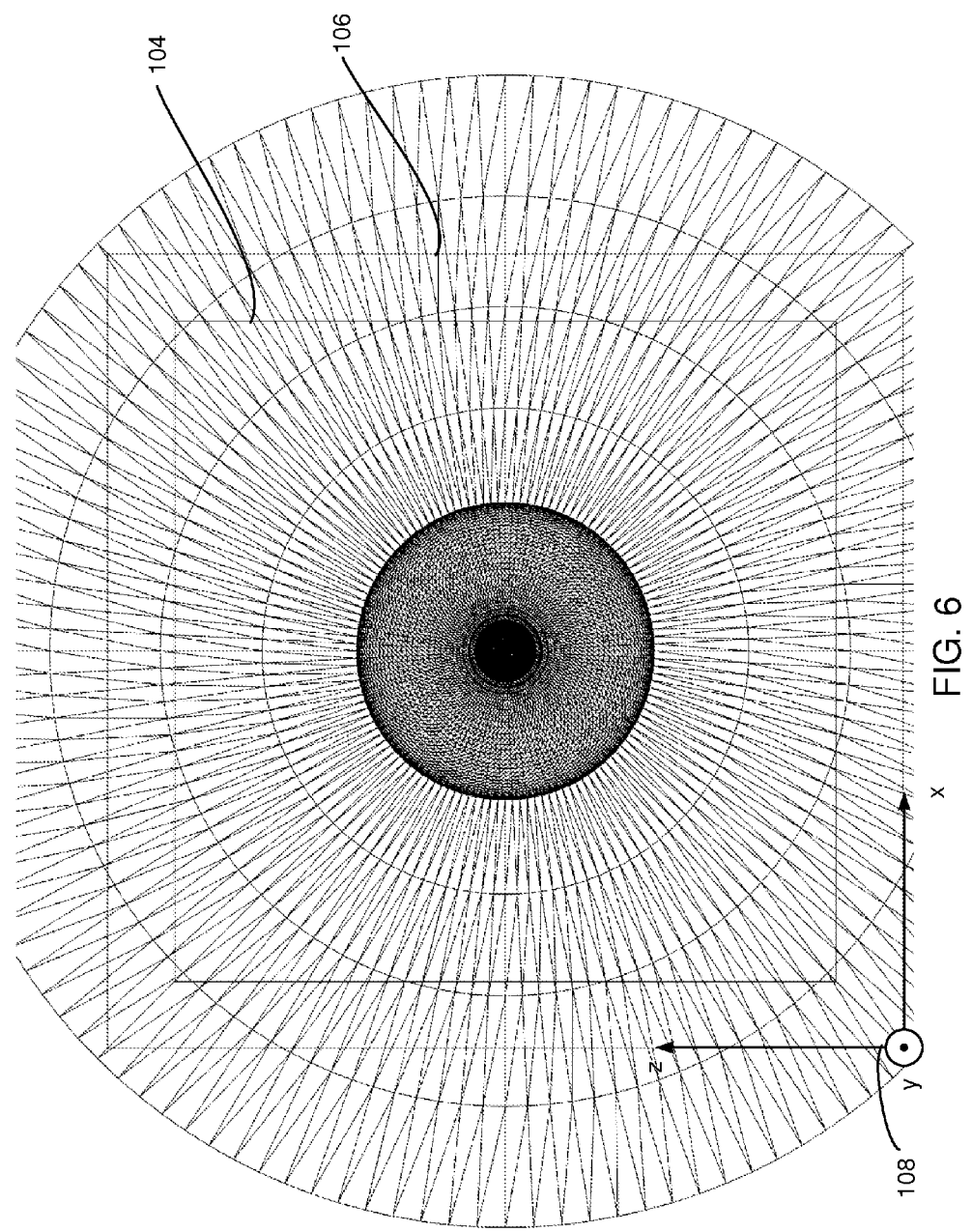
FIG. 6 illustrates the resulting display on a screen after all steps of the flowchart of FIG. 2 have been performed, according to an embodiment of the present invention.

FIG. 6 illustrates the resulting display on screen 54 for display step 160, i.e. after all translation and projection steps of the flowchart of FIG. 2 have been performed, according to an embodiment of the present invention. S in this case is 4. While for clarity planes 104 and 106 are displayed in FIG. 6, typically in the display of screen 54 they are not shown.

The resulting display illustrated in FIG. 6 is a symmetrical 2D display, and it will be appreciated that the symmetry is a result of the initial symmetry of 3D mesh 100 (FIG. 3), together with the choice of point B as being on the axis of symmetry of the 3D mesh (FIG. 5). However, it will be understood that if the original mesh has no symmetry, such as is the case where the mesh is of a surface of a heart chamber, the final 2D result displayed also has no symmetry. Even where the original mesh does have symmetry, the final 2D result may not have symmetry. For example if in FIG. 5 point B is selected to be not on the axis of symmetry, the final result is a non-symmetrical 2D display.

For simplicity the description above has assumed that transformations are performed on a plurality of vertices, typically derived from a surface enclosing a volume. The vertices are configured into the form of a 3D mesh, which is transformed by the steps of the flowchart into a 2D mesh. It will be understood that the 2D mesh generated by the transformed vertices is typically used as a scaffolding, and that from the scaffolding processor 40 constructs a 2D surface, the surface comprising the transformed vertices.

It will be appreciated that the 2D surface produced may be used to represent 3D maps such as map 64, illustrating the internal surface of heart 22, and map 66, illustrating the temperature distribution around distal tip 26. Other 3D maps that may be transformed to 2D surfaces according to the description herein will be apparent to those having ordinary skill in the art, and all such maps are assumed to be comprised in the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for mapping and displaying a three-dimensional (3D) surface of a heart that contains a volume in a 3D space, the method comprising:
   providing a mapping arrangement, the mapping arrangement comprising:
   a catheter having a distal tip;
   a display screen; and
   a processor, the processor being operatively connected to the display screen and the catheter;
   inserting the catheter into the heart of a patient, moving the tip of the catheter to a plurality of different positions in the heart while tracking and recording said plurality of different positions, and thereby acquiring a set of 3D vertices representing the 3D surface of the heart using the catheter;
   defining in the 3D space a first plane that cuts the volume and a second plane, parallel to the first plane, that is external to the volume, thereby partitioning the 3D vertices into a first set of the vertices that are not between the first and second planes and a second set of the vertices that are located between the first and the second planes in the 3D space;
   defining a point B on the second plane, and a vertical line through point B which is orthogonal to the second plane;
   generating first projected points by: projecting the vertices in the first set along a direction orthogonal to the first plane onto the first plane;
   generating second projected points by:
   translating the vertices in the second set by respective distances and in respective horizontal directions parallel to the second plane;
   wherein the horizontal translation distances of respective vertices in the second set are directly proportional to both (i) their respective distances from the first plane and (ii) to a scaling factor S, the scaling factor S being identical for all vertices in the second set;
   wherein the horizontal directions traveled by respective vertices in the second set are directly away from said vertical line through point B; and
   further translating the vertices in the second set vertically and orthogonally onto the first plane; and
   displaying the first and second projected points together on the display screen as a two-dimensional (2D) representation of the 3D surface of the heart, the displaying of the 2D representation comprising displaying the first projected points overlapping a center area of the 2D representation, and displaying the second projected points positioned radially outward from the center area of the 2D representation and at least partially surrounding the first projected points.

2. The method according to claim 1, comprising during said displaying of the 2D representation:
displaying the distal tip of the catheter on the display screen.

3. The method according to claim 1, further comprising a user selecting the scaling factor S.

4. The method according to claim 1, wherein during said displaying of the 2D representation:
the first projected points are displayed occupying an area of the display screen which corresponds to said vertical line through point B;
the second projected points are displayed at least partially surrounding the first projected points, extending radially outward from the first projected points with respect to the vertical line through point B.

5. The method according to claim 1, wherein the first and second projected points are displayed as a mesh in the 2D representation, with the second projected points surrounding and extending radially outward from the first projected points.

6. The method according to claim 5, wherein each of the respective translations of a given vertex is directly proportional to the distance from the given vertex to the pre-defined point.

7. The method according to claim 1, wherein the distal tip of the catheter comprises an ablation electrode;
the method further comprising ablating heart tissue using the ablation electrode.

8. The method according to claim 1,
wherein the distal tip of the catheter comprises an electrode;
the method comprising detecting local activation times (LAT) at a plurality of different locations in the heart while the tip of the catheter is moved.

9. The method of claim 1:
wherein the catheter comprises a temperature sensor;
the method further comprising:
taking temperature measurements at said plurality of different positions in the heart using the temperature sensor; and
displaying temperature data on the 2D representation of the 3D surface of the heart.

10. The method according to claim 1, wherein the 3D surface comprises an axis of symmetry, and wherein the 2D representation has symmetry related to the axis of symmetry.

11. The method according to claim 1, wherein the 3D surface has no symmetry.

12. Apparatus for mapping a three-dimensional (3D) surface that contains a volume in a 3D space, the apparatus comprising:
a catheter having a distal tip;
a display screen configured to display a two-dimensional (2D) representation of the 3D surface; and
a processor configured to:
when the catheter is inserted into the heart of a patient and the distal tip is moved to a plurality of different positions in the heart, to track and record said plurality of different positions, and to thereby acquire a set of 3D vertices representing the 3D surface of the heart;
define in the 3D space a first plane that cuts the volume and a second plane, parallel to the first plane, that is external to the volume, thereby partitioning the 3D vertices into a first set of the vertices that are not between the first and second planes, and a second set of the vertices that are located between the first and the second planes in the 3D space;
define a point B on the second plane, and a vertical line through point B which is orthogonal to the second plane;
generating first projected points by: projecting the vertices in the first set along a direction orthogonal to the first plane onto the first plane;
generate second projected points by:
translating the vertices in the second set by respective distances and in horizontal directions parallel to the second plane;
wherein the horizontal translation distances of respective vertices in the second set are directly proportional to both (i) their respective distances from the first plane and (ii) to a scaling factor S, the scaling factor S being identical for all vertices in the second set;
wherein the horizontal directions traveled by respective vertices in the second set are directly away from said vertical line through point B; and
further translating the vertices in the second set vertically and orthogonally onto the first plane; and
display the first and second projected points together on the display screen as a two-dimensional (2D) representation of the 3D surface of the heart.

13. The apparatus according to claim 12, the apparatus being further configured to display the first projected points at a center of the display screen, and display the second projected points radially outward from the center of the display screen and at least partially surrounding the first projected points.

14. The apparatus according to claim 12, the apparatus being further configured wherein during said displaying of the 2D representation:
the first projected points are displayed occupying an area of the display screen which corresponds to said vertical line through point B;
the second projected points are displayed at least partially surrounding the first projected points, extending radially outward from the first projected points with respect to the vertical line through point B.

15. The apparatus according to claim 12, the apparatus being further configured wherein the first and second projected points are displayed as a mesh in the 2D representation, with the second projected points surrounding and extending radially outward from the first projected points.

16. The apparatus according to claim 15, wherein each of the respective translations of a given vertex is directly proportional to the distance from the given vertex to the pre-defined point.

17. The apparatus according to claim 12, wherein the distal tip of the catheter comprises an ablation electrode.

18. The apparatus according to claim 12,
wherein the distal tip of the catheter comprises an electrode;
the apparatus being configured for detecting local activation times (LAT) at a plurality of different locations in the heart while the tip of the catheter is moved.

19. The apparatus according to claim 12, wherein the catheter comprises a temperature sensor configured for taking temperature readings inside the heart;
the apparatus being further configured to collect temperature data when the catheter is moved inside the heart, and to display temperature data on the 2D representation of the 3D surface of the heart.

20. A non-transitory computer-readable medium comprising computer executable instructions;

wherein when the instructions are executed by a processor of a computer, the processor being operatively connected to a display screen and to a catheter having a distal tip, with the catheter being inserted into a heart of a patient, the processor, display screen, and catheter perform the following steps:

when the catheter is inside the heart of the patient and the distal tip is moved to a plurality of different positions in the heart, to track and record said plurality of different positions, and to thereby acquire a set of 3D vertices representing a 3D surface of the heart, wherein the 3D surface of the heart contains a 3D space;

define in the 3D space a first plane that cuts the volume and a second plane, parallel to the first plane, that is external to the volume, thereby partitioning the 3D vertices into a first set of the vertices that are not between the first and second planes, and a second set of the vertices that are located between the first and the second planes in the 3D space;

define a point B on the second plane, and a vertical line through point B which is orthogonal to the second plane;

generate first projected points by: projecting the vertices in the first set along a direction orthogonal to the first plane onto the first plane;

generate second projected points by:
 translating the vertices in the second set by respective distances and in horizontal directions parallel to the second plane;
  wherein the horizontal translation distances of respective vertices in the second set are directly proportional to both (i) their respective distances from the first plane and (ii) to a scaling factor S, the scaling factor S being identical for all vertices in the second set;
  wherein the horizontal directions traveled by respective vertices in the second set are directly away from said vertical line through point B; and
 further translating the vertices in the second set vertically and orthogonally onto the first plane; and display the first and second projected points together on the display screen as a two-dimensional (2D) representation of the 3D surface of the heart.

21. The computer-readable medium according to claim 20, wherein when the instructions are executed by said processor:

during said displaying of the 2D representation, the first projected points are displayed at a first area of the display screen, and the second projected points are displayed radially outward from the first area of the display screen and at least partially surrounding the first projected points.

22. The computer-readable medium according to claim 20:

wherein the instructions are held on at least one of: magnetic memory, optical memory, and electronic memory.

23. The computer-readable medium according to claim 20, wherein when the instructions are executed by said processor:

the distal tip of the catheter is displayed on the display screen during said displaying of the 2D representation; and a user input selecting the scaling factor S is received, and is applied during said generating of the second projected points.

24. The computer-readable medium according to claim 20, wherein when the instructions are executed by said processor, during said displaying of the 2D representation:

the first projected points are displayed occupying an area of the display screen which corresponds to said vertical line through point B;

the second projected points are displayed surrounding the first projected points, extending radially outward from the first projected points with respect to the vertical line through point B.

* * * * *